Nov. 3, 1964  D. T. AYERS, JR  3,155,012
FLUID PRESSURE MOTOR MECHANISM
Filed April 8, 1963  3 Sheets-Sheet 1
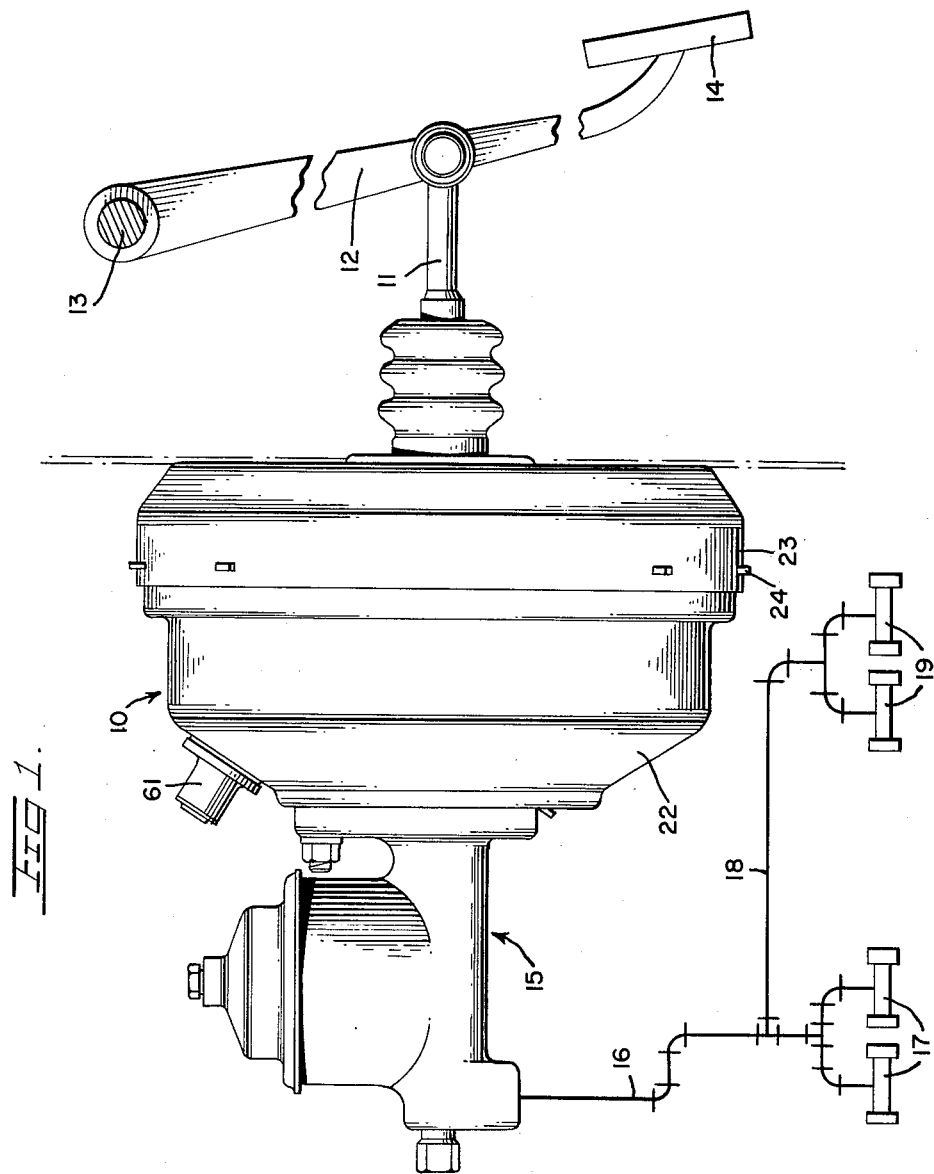
INVENTOR.
DAVID T. AYERS, JR.
BY
ATTORNEY

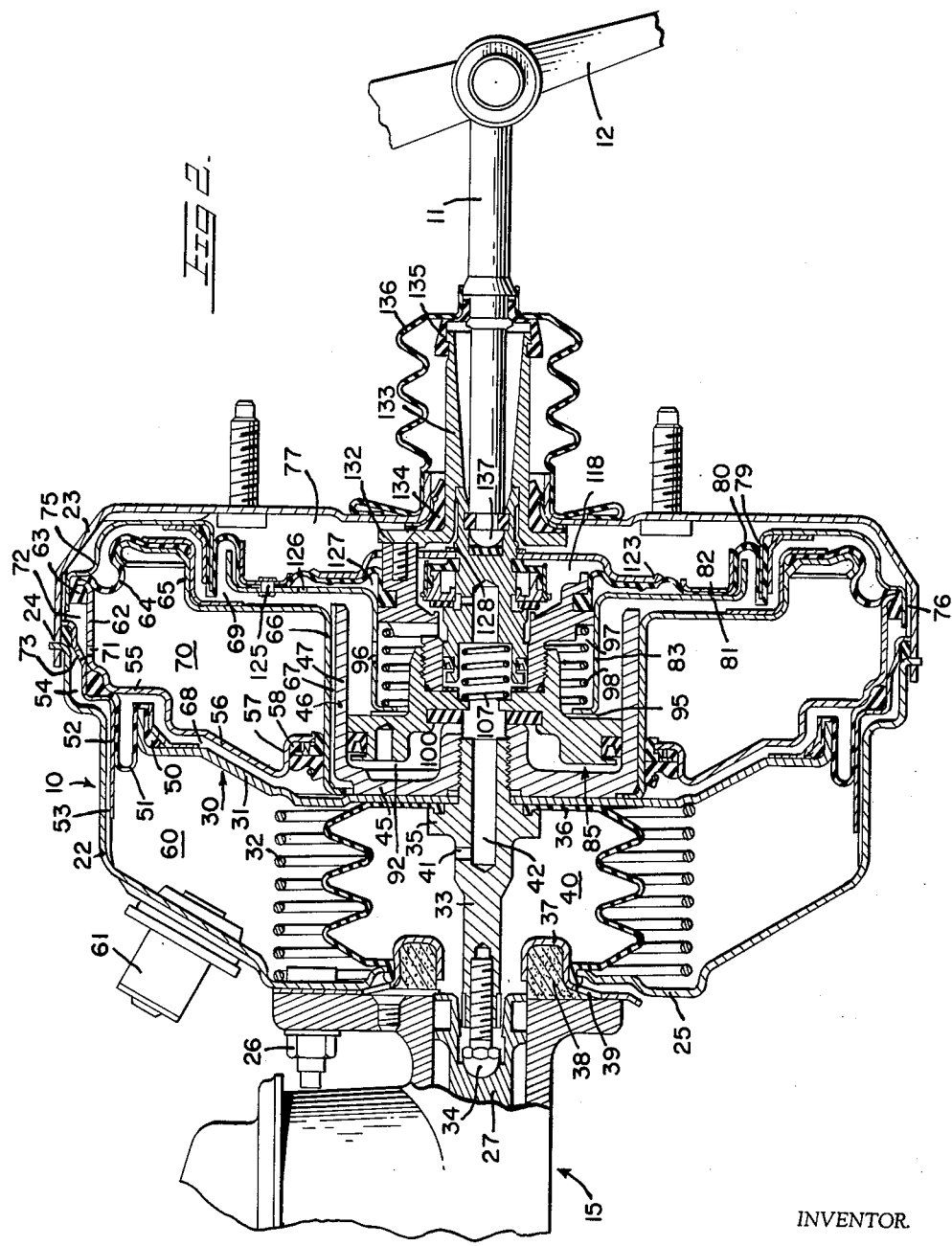

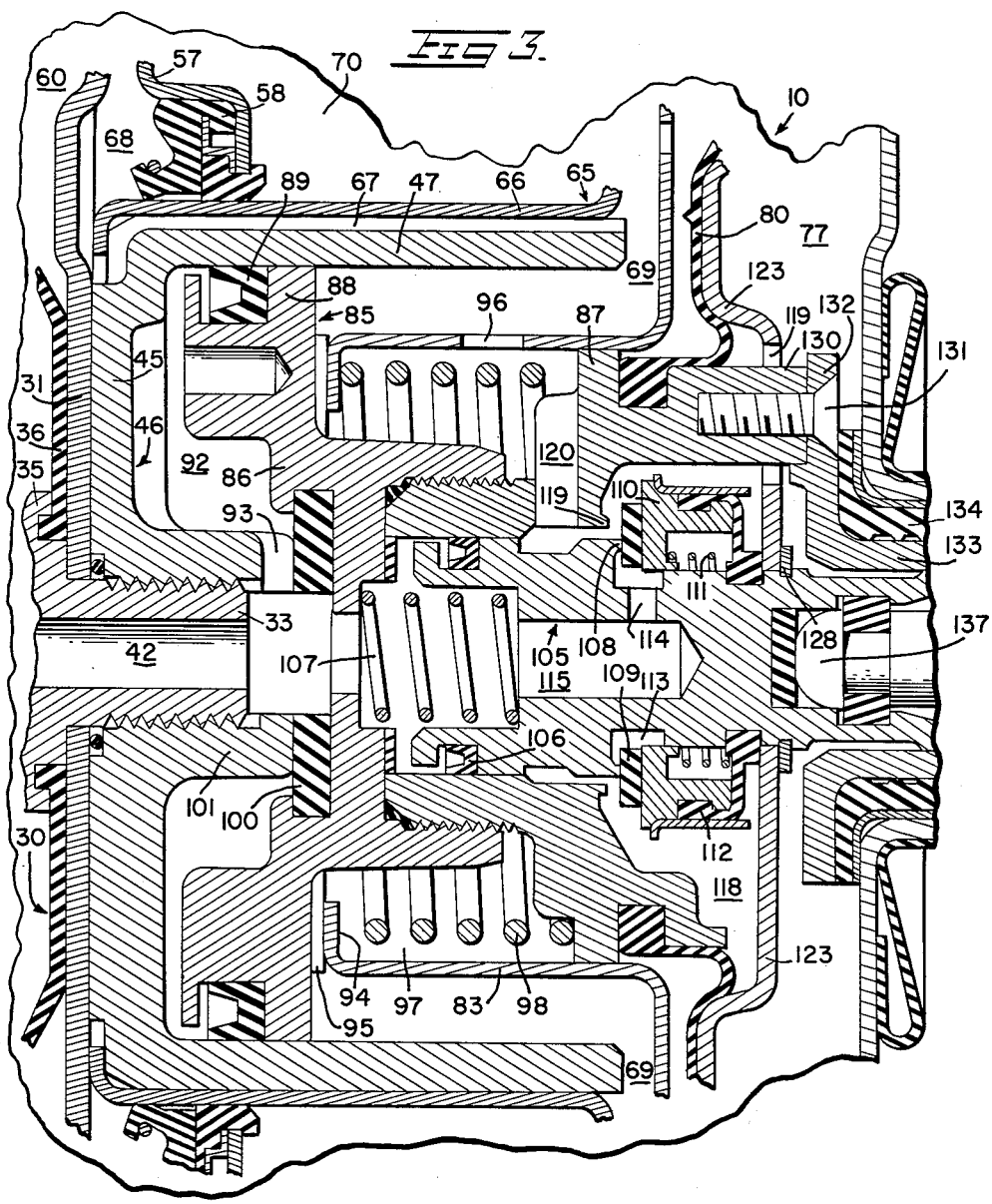

3,155,012
FLUID PRESSURE MOTOR MECHANISM
David T. Ayers, Jr., Birmingham, Mich., assignor to Kelsey-Hayes Company, Romulus, Mich., a corporation of Delaware
Filed Apr. 8, 1963, Ser. No. 271,406
16 Claims. (Cl. 91—391)

This invention relates to a fluid pressure motor mechanism, and particularly to a vacuum suspended brake-operating motor for motor vehicle braking systems wherein two pressure responsive elements are connected to a central hub structure so that their combined forces are utilized for operating the master cylinder plunger.

In my co-pending application Serial No. 263,856, filed March 8, 1963, I have disclosed and claimed a motor mechanism of the general type referred to having a plurality of motor chambers in which pressures are balanced when the parts are in the normal off positions. The motor is fully power operable as distinguished from a booster mechanism, and the motor includes a normally stationary axially movable structure operable by the brake pedal in the event of a failure or substantial drop in the available differential pressure for operating the motor. The pressure-balanced chambers include chambers on opposite sides of the normally stationary unit referred to, and in the absence of retaining differential pressures, it is necessary to use spring force to normally retain the axially movable structure in its normal position until the valves are operated. Under such conditions, differential pressures for operating the motor also act to hold the axially movable structure in normal position under normal operating conditions.

An important object of the present invention is to provide a motor mechanism of the type referred to having an axially movable normally stationary structure movable by the brake pedal in the event of a failure in differential pressure for applying the brakes, and wherein no spring force is necessary to hold the axially movable structure in normal position, this being accomplished in the off positions of the parts by differential pressure.

A further object is to provide such a motor mechanism having a plurality of chambers, certain of which are in constant communication with a source of vacuum and the others of which are normally connected to the source of vacuum and which are connectible to the atmosphere to operate the motor, and wherein certain internal surfaces are subject to atmospheric pressures at all times to maintain a differential pressure tending to hold the axially movable structure in its normal off position.

A further object is to provide a motor mechanism of this type wherein surfaces opposite those in constant communication with the atmosphere are open to one of the variable pressure chambers which is connectible to the atmosphere whereby the differential pressure biasing force tending to hold the axially movable structure in off position progressively decreases as motor energization increases, such differential pressures being balanced at pressure "run-out," that is, when the motor is energized to its maximum extent, thus eliminating the pressure biasing forces under such conditions to permit operation of the brake pedal so that pedal forces can assist the motor in applying the brakes when maximum braking pressures are desired.

A further object is to provide such a motor mechanism having novel means for supplying air to a chamber, the pressure in which is depended upon to normally maintain the axially movable structure in normal position.

Other objects and advantages of the invention will become apparent during the course of the following description.

In the drawings I have shown one embodiment of the invention. In this showing—

FIGURE 1 is a side elevation of the motor mechanism and associated parts showing the connection of the master cylinder to the wheel cylinders;

FIGUURE 2 is an axial sectional view through the motor mechanism showing portions of the brake pedal and master cylinder; and FIGURE 3 is an enlarged fragmentary sectional view through the principal parts of the motor mechanism.

Referring particularly to FIGURE 1, the motor mechanism is indicated as a whole by the numeral 10 and contains pressure responsive means and a valve mechanism, described in detail below, operable by a push rod 11 connected to a depending brake pedal 12 pivotally supported at its upper end as at 13 and having a pedal pad 14 at its lower end. The motor mechanism operates a master cylinder indicated as a whole by the numeral 15 for displacing fluid through a line 16 to the front wheel cylinders 17. A branch line 18 supplies hydraulic fluid pressure to the rear wheel cylinders 19.

The motor mechanism 10 comprises a pair of casing sections 22 and 23 suitably connected as at 24. The section 22 is provided with a front wall 25 to which the master cylinder 15 is secured as at 26. This master cylinder may be conventional and includes a fluid displacing plunger 27 for forcing fluid under pressure through the lines 16 and 18, preferably through the usual residual pressure valve (not shown).

A pressure responsive unit indicated as a whole by the numeral 30 is arranged within the motor. This unit comprises a plate 31 engaged by a return spring 32 to bias the pressure responsive unit to its off position as shown. The inner periphery of the plate is connected to a push rod 33 having an adjustable engagement as at 34 with the master cylinder plunger 27. A flange 35 on the push rod 33 cooperates with the plate 30 to maintain in position the adjacent end of a diaphragm 36 of the convolute type shown. The other end of this diaphragm is clamped between the inner periphery of the head 25 and a retaining ring 37, and this ring also serves to retain in position an air cleaner 38 open to the atmosphere through ports 39 in the head 25. Air flowing through the cleaner 38 enters a chamber 40 within the diaphragm 36 and flows through a port 41 into an axial passage 42 in the push rod 33, for a purpose to be described.

The rear portion of the plate 31 is maintained in position by a wall 45 of a member 46 having an annular rearwardly extending wall 47, the inner surface of which is formed as a cylinder for a purpose to be described.

The plate 31 is connected to an inner bead 50 formed on a rolling diaphragm 51 which extends over a plate 52 having a cylindrical forward portion seating against the casing section 22, the casing section 22 being grooved as at 53 to provide a passage communicating with a chamber 54. The outer periphery of the diaphragm 51 is clamped in position by the radially outer portion of a plate 55 having a frusto-conical inner portion 56 terminating in a retainer 57 in which is arranged a sealing means 58.

The plate 31 and diaphragm 51 form with the casing section 22 a constant vacuum chamber 60 adapted to communicate with a source of vacuum through a fitting 61. The outer cylindrical portion 62 of the plate 56 has sealing engagement with an outer bead 63 from a diaphragm 64, the inner periphery of which is fixed with respect to a plate 65, the inner extremity of which is formed cylindrically as at 66 to fit over the cylindrical wall 47. The latter wall is grooved as at 67 so that a variable pressure chamber 68 between the plates 31 and 56 communicates with a second variable pressure chamber 69 formed rearwardly of the plate 65.

The plate 56 forms with the plate 65 and its diaphragm 64 a constant vacuum chamber 70 communicating through a port 71 with an outer chamber 72, and this chamber communicates with the chamber 54 through a port 73. The chamber 60 is in fixed communication with a source of vacuum, as stated, and vacuum is maintained in the chamber 70 through ports 71, chambers 72, port 73, chamber 54, and grooves 53.

The elements 31, 51, 46, 64 and 65 thus form the pressure responsive unit of the motor and all of these elements move as a unit when air is admitted to the chambers 68 and 69, as described below.

The diaphragm bead 63 is retained within an outer flange of a plate 75 fitted within the outer portion of the casing section 23 against ribs formed between grooves 76 which serve to maintain communication between the chamber 72 and a rear chamber 77 within the casing section 23. The radially inner portion of the plate 75 turns inwardly as at 79 and is clamped to a diaphragm 80. This diaphragm extends between a plate 81 and retainer 82 and the plate 81 is provided with an inner cylindrical portion 83 further referred to below.

A normally stationary axially movable structure indicated as a whole by the numeral 85 is arranged axially within the motor and includes two main elements 86 and 87 (FIGURE 3) having threaded engagement with each other as shown. The member 86 carries at its forward end an annular flange 88 carrying a double lipped seal 89 slidable within the cylindrical wall 47. The member 85 forms with the member 46 an atmospheric chamber 92 communicating as at 93 with the passage 42. Therefore, atmospheric pressure is always present in the chamber 92.

Referring to FIGURE 3, the forward end of the plate portion 83 carries an inturned flange 94 seating against ribs 95 carried by the member 86. The plate portion 83 is provided with a port 96 affording communication between the chamber 69 and a chamber 97 formed within the plate portion 83. A spring 98 between the members 86 and 87 biases the flange 94 into engagement with the ribs 95.

As previously stated, the structure 85 normally remains stationary while the pressure responsive unit 30 moves to the left in FIGURE 3. To cushion return movement of the pressure responsive unit, the member 86 carries a bumper 100 of rubber or similar material engageable with the rear end of a flange 101 on the member 86 and through which flange the passage 93 is formed.

A valve body 105 is slidable in the member 87 in sealed relation therewith as at 106 and is biased to its normal off position by a spring 107. The valve body carries a valve 108 normally engaged with a resilient valve seat 109 carried by a thimble 110 biased forwardly by a spring 111. A diaphragm 112 seals the thimble 110 with respect to the valve body 105. Inwardly of the valve 108 there is formed around the valve body 108 a chamber 113 communicating as at 114 with a bore 115 in the valve body 105, which bore obviously is in communication with the bore or passage 42.

Within the rear end of the valve body 105 and around the thimble 110 is formed a chamber 118 communicating as at 119 with the vacuum chamber 77. The chamber 118 normally communicates around a valve seat 119, formed on the member 87, with a passage 120 open to the chamber 97.

The openings 119 are formed in a plate 123 against which lies the diaphragm 80 sealed at its inner end to the member 87. The plate 81 is provided with one or more openings 126 connecting the chamber 69 to a chamber 127 formed between the plate 81 and diaphragm 80. The plate 123 seats against the diaphragm as shown and has its inner extremity fixed to the valve body 105 by a snap ring 128.

The openings 119, preferably three in number, provide space for the passage therethrough of bosses 130 integral with the member 87, and the bosses 130 are attached as at 131 to an annular flange 132 formed on the forward end of a sleeve member 133 sealed with respect to the casing section 23 as at 134. A seal 135 connects the sleeve member 133 to the push rod 11, and such rod is connected to the casing section 23 by a boot 136. The forward end of the push rod 11 is connected as at 137 to the valve body 105 whereby movement of the pedal 12 will effect operation of the valve mechanism.

*Operation*

The parts normally occupy the positions shown in the drawings. Air is admitted through the air cleaner 38 into the chamber 40 and, as stated, atmospheric pressure is always present in the chamber 92. This atmospheric pressure extends through the valve body and port 114 into the chamber 113 but is disconnected from the chamber 118 since the valve 108 is normally closed. Vacuum is maintained at all times in the chambers 60, 70 and 77, as described above. Since vacuum is always present in the chamber 118, through its connection with the chamber 77, vacuum will be normally maintained in the chambers 68 and 69. It will be apparent that since vacuum is being maintained in the chamber 69, while atmospheric pressure is maintained in the chamber 92 acting against the member 86, the normally stationary structure 85 will be maintained in its normal position, the seal 134 acting as a bumper.

When the brakes are to be operated, the pedal 12 will be depressed to move the rod 11 to the left in FIGURE 2, thus moving the valve 108 to the left, and the spring 111 causes the seat 109 to follow the valve 108 until the valve seat engages the valve 119. At this point, the valve elements will be in lapped positions. Further movement to the left of the valve body by movement of the pedal will move the valve 108 from the seat 109. It will be apparent that the closing of the valve 119 will have disconnected vacuum from the chambers 69 and 68, and upon opening movement of the valve 108, atmospheric pressure will be admitted through passage 120 into chamber 97 and through port 96 to the chamber 69. The passage 67 will admit such air into the chamber 68, and accordingly, pressure will rise in the chambers 68 and 69 to act against the plates 31 and 65 and associated elements to transmit force to the push rod 33 to operate the master cylinder plunger 27 and thus displace fluid through lines 16 and 18 (FIGURE 1) into the wheel cylinders 17 and 19.

Thus the brake shoes will be caused to engage the drums and the extent of such engagement will depend upon pressures in the chambers 68 and 69. As previously stated, differential pressures in the chambers 92 and 69 maintains the normally stationary structure 85 in its normal position. As air is admitted into the chambers 97 and 69, the differential pressures tending to hold the structure 85 in normal position progressively decreases, but for most brake applications, the drop in such differential pressures is not sufficient to allow the structure 85 readily to be moved from its normal position.

During initial operation of the mechanism, air pressure acting to the right against the diaphragm 80, plate 123 and associated elements provides an initial stage of reaction against the brake pedal. When the brake shoes engage the drums and movement of the master cylinder plunger is retarded, there will be a rapid increase in pressure in the chambers 68 and 69. Pressure in the latter chamber at a predetermined point will move the plate 81 against the loading of the spring 98 and the plate 81 will engage the diaphragm 80 and the latter will transmit force through the plate 123 to the valve body to provide a second and higher stage of pedal reaction which will be proportional to the degree of energization of the motor.

In the event of a failure in the source of vacuum so that atmospheric pressure exists in all of the chambers 60, 68, 69, 70 and 77, depression of the pedal 12 beyond its normal valve operating position will transmit force to the pressure responsive unit 30 to apply the brakes. It will be noted that the left-hand end of the valve body 105 is spaced from the portion of the member 85 in the path of the travel thereof, thus providing a lost motion connection within the limits of which the valve mechanism is operable. This lost motion connection will be taken up for the pedal operation of the structure 85 and, through the bumper 100, the flange 101 of the pressure responsive unit to move this unit and the push rod 33 to apply the brakes. Pressures being equalized in all of the motor chambers, resistance to movement of the pedal for direct operation of the master cylinder plunger 27 will be reduced to a minimum. It will be necessary to overcome the loading of the spring 32. However, this spring need not be heavily loaded, since it requires a minimum amount of force to return the pressure responsive unit to normal position in view of the use of the diaphragms 51 and 64. It will be noted that the seal 89 slides in the cylindrical wall 47 and effectively disconnects the chambers 69 and 92 to maintain the differential pressures necessary to normally retain the structure 85 in its normal position.

While reference has been made to a failure of vacuum, it will be apparent that leakage in the vacuum line to the fitting 61 may occur to such an extent that insufficient pressure can be built up in the chambers 68 and 69 for a full brake application. If this occurs, manual force can still be applied to the pedal 12 to directly apply force in the manner described to the push rod 27 to assist whatever differential pressure is present in applying the brakes.

Moreover, assuming that under some conditions, for example, in making a panic stop, the power of the motor is not sufficient for the full application of the brakes, pedal assistance can also be supplied. Under such conditions, when the motor is fully energized, atmospheric pressure will exist in the chambers 68 and 69, and without resistance from differential pressures, force can be applied to the pedal 12 to assist the motor in providing maximum brake application.

It is impossible from a practical standpoint to maintain the structure 85 in its normal position in the absence of some force to hold it in such position, for example, either a spring or differential pressures. The present construction provides effective differential pressures for this purpose and under normal operating conditions, the structure 85 will not be moved during a brake application.

It will be apparent that the novel use of two pressure responsive elements, namely the plates 31 and 65 and their diaphragms, provides for a substantial increase in the motor power while minimizing the overall diameter of the motor. Moreover, the axial length of the motor is maintained at a minimum by mounting the valve mechanism and the structure 85 within the wall 47.

From the foregoing, it will be apparent that under normal operating conditions, it is necessary to move the pedal 12 only a slight distance for the full energization of the motor. As motor energization increases, air pressure admitted to the chamber 69 sets up a progressively increasing differential pressure on opposite sides of the diaphragm 80 which overcomes the counter-reaction spring 98 to increasingly react against the brake pedal to provide the latter with "feel" resistance proportional to differential pressures in the motor. It also will be apparent that upon a failure of vacuum, or a reduction in a degree of vacuum, due to leakage, for example, pedal forces can operate the brakes, or assist the motor in such operation.

It is to be understood that the form of the invention shown and described is to be taken as a preferred example of the same and that various changes in the shape, size and arrangement of the parts may be made as do not depart from the spirit of the invention or the scope of the appended claims.

I claim:

1. A fluid pressure motor mechanism comprising a casing having a pair of pressure responsive elements and a pair of walls cooperating with said casing and said elements to form alternately low pressure and high pressure chambers, said high pressure chambers communicating with each other and said low pressure chambers communicating with each other, one of said low pressure chambers communicating with a source of low pressure, a valve mechanism normally connecting said high pressure chambers to said low pressure chambers and movable to connect said high pressure chambers to a source of higher pressure to actuate said pressure responsive elements, a normally stationary axially movable unit carrying a part of said valve mechanism and having oppositely facing pressure surfaces subject respectively to pressures in said low pressure source and to the same pressure as said high pressure chambers to hold said unit stationary in a normal position, said pressure responsive elements being connected to each other and having a radially inner rigid member in abutting relationship with said unit, said valve mechanism including a manually operable member having lost motion connection with said unit, whereby, upon a failure of said valve mechanism to establish differential pressures in said chambers, movement of said manually operable member will move said unit to actuate said rigid radially inner member.

2. A fluid pressure motor mechanism comprising a casing having a pair of pressure responsive elements and a pair of walls cooperating with said casing and said elements to form alternately fixed vacuum and variable pressure chambers, said variable pressure chambers communicating with each other and said vacuum chambers communicating with each other, one of said vacuum chambers communicating with a source of vacuum, a valve mechanism normally connecting all of said chambers to balance pressures therein and movable to connect said variable pressure chambers to the atmosphere to actuate said pressure responsive elements, a normally stationary axially movable unit carrying a part of said valve mechanism and having oppositely facing surfaces subject to atmospheric pressure and vacuum to tend to hold said unit stationary in a normal position, said pressure responsive elements being connected to each other and having a relatively rigid inner force transmitting member with which said unit is engageable, said unit having abutting relationship with said force transmitting member, said valve mechanism including a manually operable member having lost motion connection with said unit, whereby, upon a failure of said source of vacuum, movement of said manually operable member will move said unit to actuate said radially inner member.

3. A fluid pressure motor mechanism comprising a casing having a plurality of pressure responsive elements and a plurality of walls cooperating with said casing and said elements to form alternately low and high pressure chambers, one of said low pressure chambers being connected to a source of low pressure and in fixed communication with the other low pressure chambers, a valve mechanism normally connecting said high pressure chambers to said low pressure source and movable to connect said high pressure chambers to a source of higher pressure to actuate said pressure responsive elements, a normally stationary axially movable unit carrying parts of said valve mechanism, one of said pressure responsive elements having a rigid axial portion, said unit having a member movable in said axial portion in sealed relation therewith and defining therewith a chamber in fixed communication with said source of higher pressure whereby said unit is maintained by said higher pressure in a normal position, said valve mechanism having a manually operable portion engageable with said unit and said unit being engageable with said rigid axial portion of said one pressure responsive element whereby, upon a failure of said valve mechanism to establish differential pressures in said high and low pressure chambers, manual operation of said valve mechanism will effect movement of said rigid portion of said one pressure responsive element.

4. A fluid pressure motor mechanism comprising a casing having a plurality of pressure responsive elements and a plurality of walls cooperating with said casing and said elements to form alternately low and high pressure chambers, one of said low pressure chambers being connected to a source of vacuum and in fixed communication with the remaining low pressure chambers, a valve mechanism normally connecting said high pressure chambers to said low pressure chambers, a normally stationary axially movable unit carrying parts of said valve mechanism, one of said pressure responsive elements having a rigid axial portion, said unit having a member movable in said axial portion in sealed relation thereto and combining therewith to form an atmospheric chamber in fixed communication with the atmosphere whereby said unit is maintained by atmospheric pressure in a normal position, a manually operable member connected to another part of said valve mechanism to operate it and connect said high pressure chambers to said atmospheric chamber, said other part of said valve mechanism being engageable with said unit and said unit being engageable with said rigid axial portion whereby, upon a failure of vacuum in said source, manual operation of said valve mechanism will transmit movement through said unit to said rigid axial portion of said one pressure responsive element to operate it.

5. A mechanism according to claim 4 wherein said rigid axial portion of said one pressure responsive element comprises a cylinder, said unit having a portion formed as a piston slidable in said cylinder and forming with one end of the latter said atmospheric chamber.

6. A mechanism according to claim 4 wherein said rigid axial portion of said one pressure responsive element comprises a cylinder, said unit having a portion formed as a piston slidable in said cylinder and forming with one end of the latter said atmospheric chamber, another of said pressure responsive elements comprising an outer diaphragm and an inner relatively rigid plate fixed to the wall of said cylinder.

7. A mechanism according to claim 4 wherein said rigid axial portion of said one pressure responsive element comprises a cylinder, said unit having a portion formed as a piston slidable in said cylinder and forming with one end of the latter said atmospheric chamber, another of said pressure responsive elements comprising a radially outer annular diaphragm and a radially inner relatively rigid plate having a cylindrical extension fitting around said cylinder, the wall between said two pressure responsive elements having a seal at its inner periphery within which said cylindrical portion slides, said cylinder and said cylindrical portion having a passage therebetween connecting said high pressure chambers.

8. A fluid pressure motor mechanism comprising a casing having a pair of pressure responsive elements and a pair of walls cooperating with said casing and said elements to form alternate vacuum and variable pressure chambers, one of said vacuum chambers being connected to a source of vacuum and in fixed communication with the other vacuum chamber, a valve mechanism normally connecting said variable pressure chambers to said vacuum chambers, a normally stationary axially movable unit carrying a portion of said valve mechanism, one of said pressure responsive elements having a rigid axial portion to which the other pressure responsive element is connected, said unit having a member movable in said axial portion in sealed relation thereto and forming therewith an atmospheric chamber communicating with the atmosphere whereby said unit is maintained by atmospheric pressure in a normal position, a manually operable member connected to another portion of said valve mechanism to operate it to connect said variable pressure chambers to said atmospheric chamber, said other portion of said valve mechanism being engageable with said unit and said unit being engageable with said rigid axial portion whereby, upon a failure of vacuum in said source, manual operation of said other portion of said valve mechanism will transmit movement through said unit to said rigid axial portion to operate it, one of said walls being exposed at one side to one of said variable pressure chambers, a third vacuum chamber at the opposite side of said one wall, said one wall being movable and biased to a normal position from which it is movable by pressure in said one variable pressure chamber, and means for transmitting force from said one wall to said manually operable member to provide a reaction force thereagainst.

9. A motor mechanism according to claim 8 wherein said one wall surrounds a portion of said unit, and a spring arranged between said surrounding portion of said one wall and said unit to bias said one wall to said normal position.

10. A motor mechanism according to claim 9 wherein said one wall comprises a plate and a diaphragm connected to said plate and sealing said one variable pressure chamber from said third vacuum chamber, and a spring arranged between said plate and said unit to bias said one wall to said normal position from which it is movable to transmit reaction force from said plate to said manually operable member in accordance with differential pressures in said one variable pressure chamber and said third vacuum chamber.

11. A fluid pressure motor mechanism comprising a casing having a pressure responsive unit comprising a pair of plates and a rigid axial member, one of said plates being connected to said axial member at one end thereof and the other plate having a co-axial portion surrounding said rigid member, a pair of walls cooperating with said plates and said casing to form alternate vacuum and pressure chambers, said vacuum chambers communicating with each other and one of such chambers having means for connecting it to a source of vacuum, said variable pressure chambers communicating with each other, said axial member having a cylinder portion, a valve mechanism normally connecting all of said chambers to balance pressures therein and movable to connect said variable pressure chambers to the atmosphere to actuate said pressure responsive unit, a normally stationary axially movable unit carrying a portion of said valve mechanism and having a plunger slidable in said cylinder portion and forming at one side thereof with said axial member an atmospheric chamber communicating with the atmosphere, the other side of said plunger being exposed to one of said variable pressure chambers whereby differential pressures on opposite sides of said plunger normally maintain said normally stationary unit in a normal position, said valve mechanism including a manually operable member having lost motion connection with said normally stationary unit and the latter being engageable with said axial member whereby, upon a failure of the source of vacuum, movement of said manually operable member will move said normally stationary unit to actuate said axial member.

12. A motor mechanism according to claim 11 wherein one of said walls forms at one side with said casing a constant vacuum chamber and has its other side open to one of said variable pressure chambers, said one wall having lost motion connection with said manually operable member, and means biasing said one wall to a normal position from which it is movable by differential pressures in said one variable pressure chamber and said constant vacuum chamber to react against said manually operable member.

13. A motor mechanism according to claim 11 wherein one of said walls forms at one side with said casing a constant vacuum chamber and has its other side open to one of said variable pressure chambers, said one wall having lost motion connection with said manually operable member, said one wall having a co-axial extension surrounding a portion of said normally stationary unit, and a spring arranged between said surrounding portion of said one wall and said normally stationary unit to bias said one wall to a normal position from which position it is movable by differential pressures in said one variable pressure chamber and said constant vacuum chamber to react against said manually operable member.

14. A motor mechanism according to claim 11 provided with a force transmitting rod connected to said axial member and provided with an axial passage communicating with said atmospheric chamber, and means for connecting said axial passage to the atmosphere.

15. A motor mechanism according to claim 11 provided with a force transmitting rod connected to said axial member and provided with an axial passage communicating with said atmospheric chamber, and an annular extensible diaphragm surrounding a portion of said rod and sealed to said one plate and to said casing and having its interior communicating with the atmosphere and with said axial passage.

16. A motor mechanism according to claim 11 provided with a force transmitting rod connected to said axial member and provided with an axial passage communicating with said atmospheric chamber, an annular extensible diaphragm surrounding a portion of said rod and sealed to said one plate and to said casing and having its interior communicating with the atmosphere and with said axial passage, and an air cleaner carried by said casing and arranged between the interior of said diaphragm and the atmosphere.

References Cited in the file of this patent

UNITED STATES PATENTS

| | | |
|---|---|---|
| 2,989,035 | Stelzer | June 20, 1961 |
| 3,013,537 | Shultz | Dec. 19, 1961 |
| 3,016,880 | Kellogg et al. | Jan. 16, 1962 |
| 3,075,499 | Prather | Jan. 29, 1963 |
| 3,076,441 | Ayers | Feb. 5, 1963 |
| 3,078,677 | Cripe | Feb. 26, 1963 |